(12) United States Patent
Smith

(10) Patent No.: US 9,737,862 B2
(45) Date of Patent: Aug. 22, 2017

(54) IN LINE MIXER

(71) Applicant: Martin Arnold Smith, The Woodlands, TX (US)

(72) Inventor: Martin Arnold Smith, The Woodlands, TX (US)

(*) Notice: Subject to any disclaimer, the term of this patent is extended or adjusted under 35 U.S.C. 154(b) by 0 days.

(21) Appl. No.: 14/713,208

(22) Filed: May 15, 2015

(65) Prior Publication Data
US 2016/0332127 A1 Nov. 17, 2016

(51) Int. Cl.
*C02F 1/32* (2006.01)
*B01F 5/06* (2006.01)

(52) U.S. Cl.
CPC ............ *B01F 5/0608* (2013.01); *C02F 1/325* (2013.01); *C02F 2201/3223* (2013.01); *C02F 2201/3228* (2013.01)

(58) Field of Classification Search
CPC .............. C02F 1/325; C02F 2201/3227; C02F 2201/3228; C02F 2301/026; C02F 2201/3223; C02F 2301/022; C02F 1/32; A61L 2/10; A23L 3/28; B01F 13/1055; A23G 1/10; A23G 1/125; A45D 2019/0066; A45D 2200/058
See application file for complete search history.

(56) References Cited

U.S. PATENT DOCUMENTS

| | | | |
|---|---|---|---|
| 8,834,016 B1* | 9/2014 | Richie | B01F 5/0062 366/134 |
| 2009/0084734 A1* | 4/2009 | Yencho | C02F 1/325 210/741 |

* cited by examiner

*Primary Examiner* — Walter D Griffin
*Assistant Examiner* — Cameron Allen

(57) ABSTRACT

A sterilizer apparatus for treating liquids, especially opaque and turbid ones characterized by a low UV radiation penetration depth, utilizing a novel tangential in-line mixer design inside an elongated reactor chamber built around an ultraviolet lamp. Other applications and adaptations of the presently disclosed apparatus include mixing fluids (including liquids and/or gases) as part of various industrial processes.

8 Claims, 6 Drawing Sheets

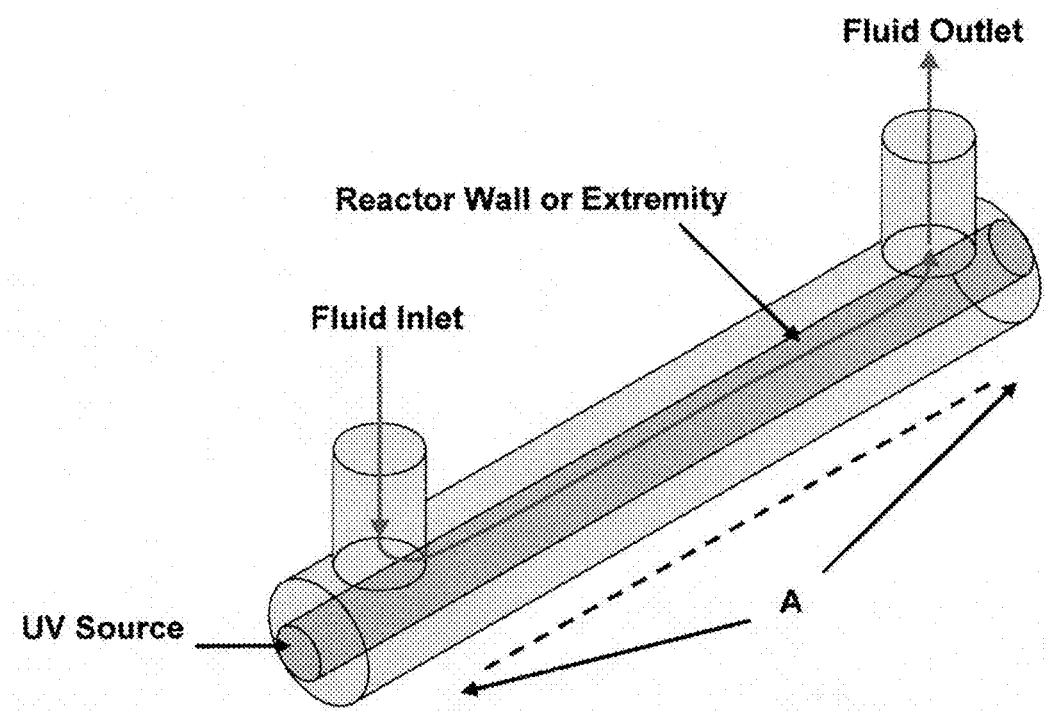
FIG. 1 – Typical UV Reactor
(Replacement)

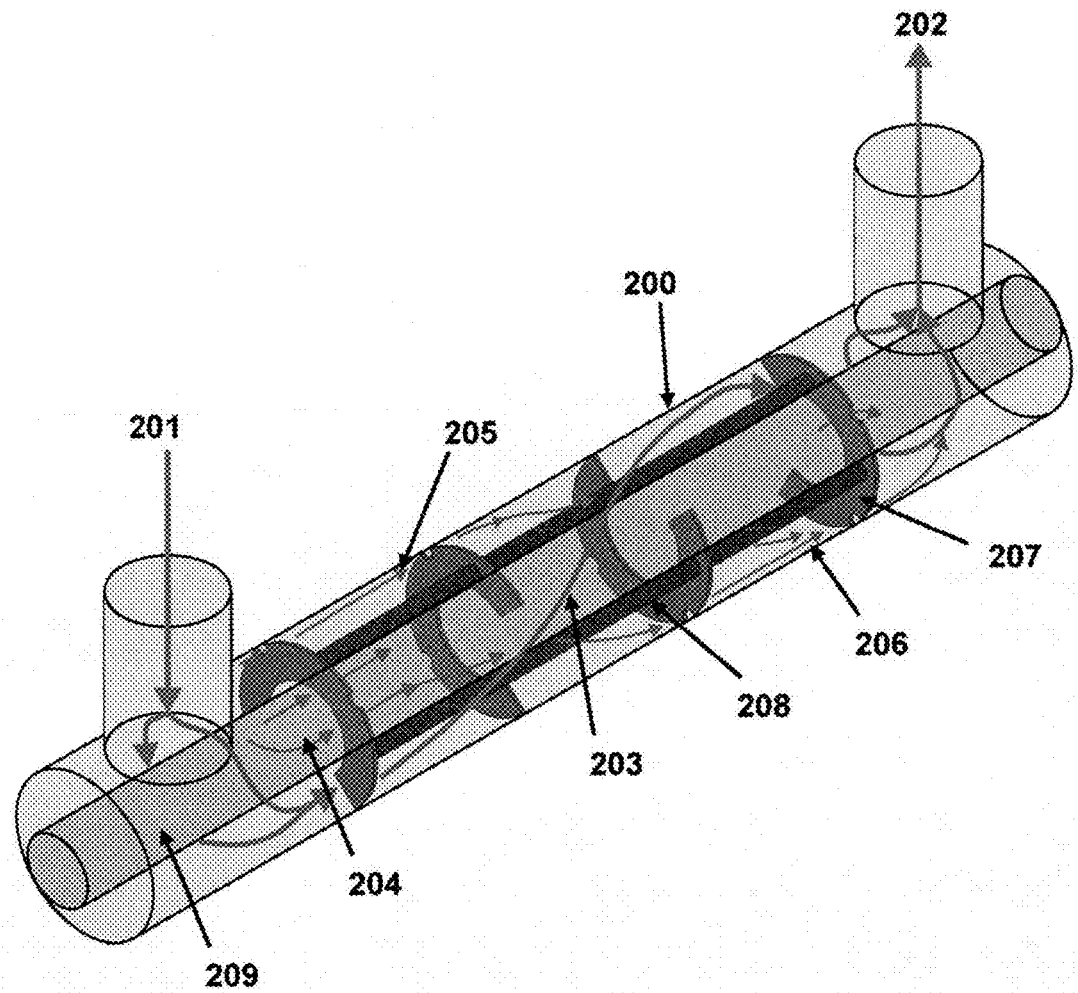
FIG. 2 – UV Reactor with In-Line Mixer – Fluid Flow Profile
(Replacement)

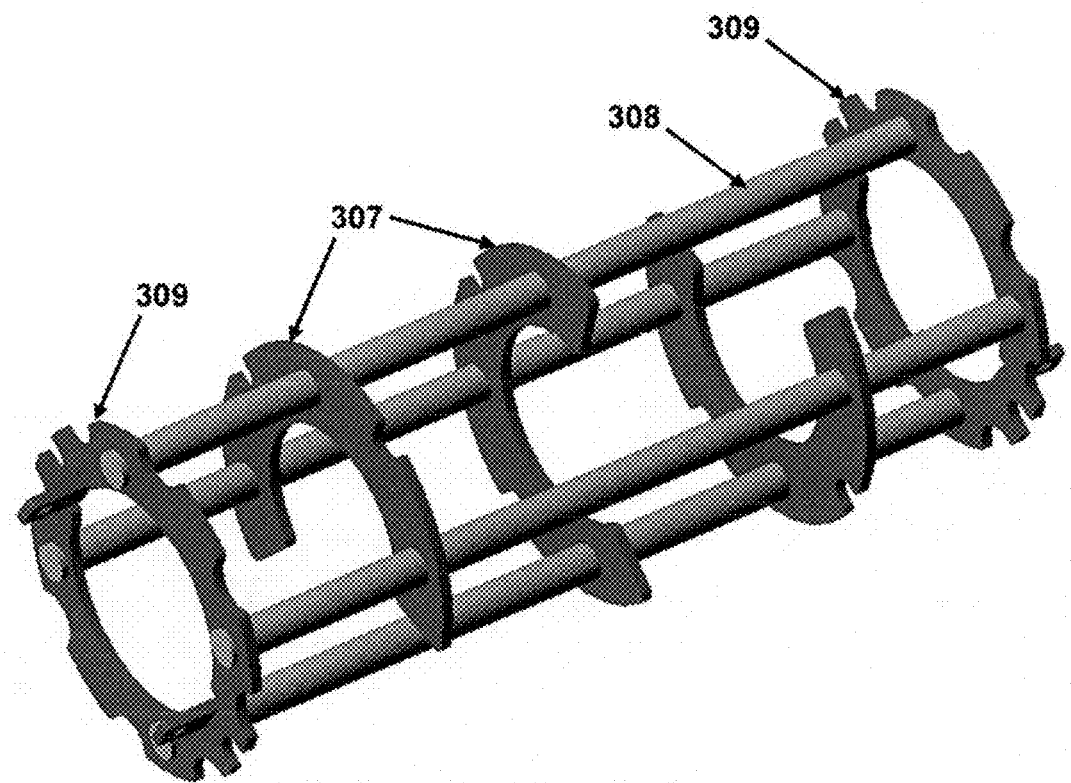
FIG. 3 – In-Line Mixer Configuration
(Replacement)
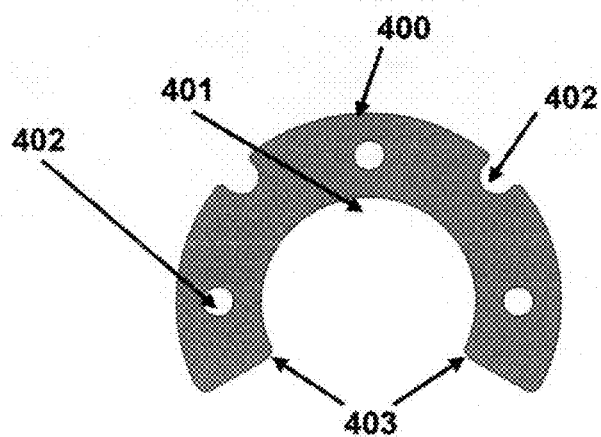
FIG. 4 – In-Line Mixer Plate Design
(Replacement)

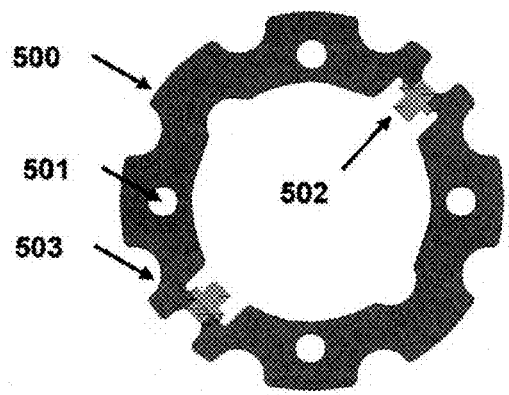
FIG. 5 – End Plate Design
(Replacement)
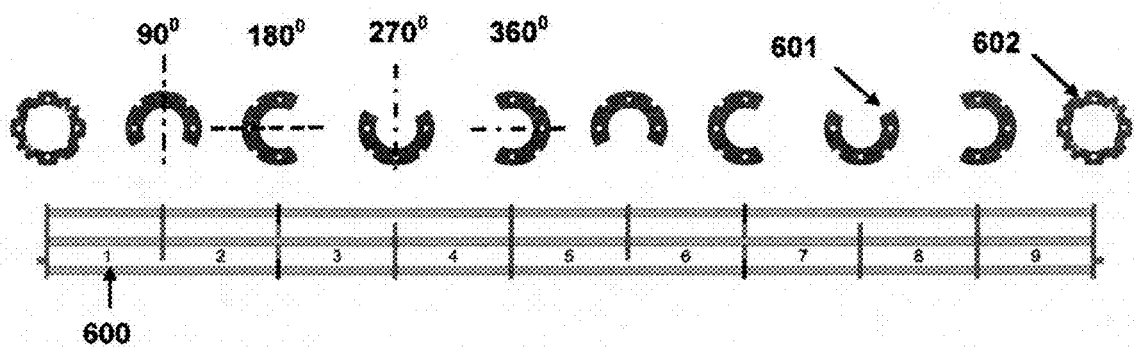
FIG. 6 – In-Line Mixer Zones
(Replacement)

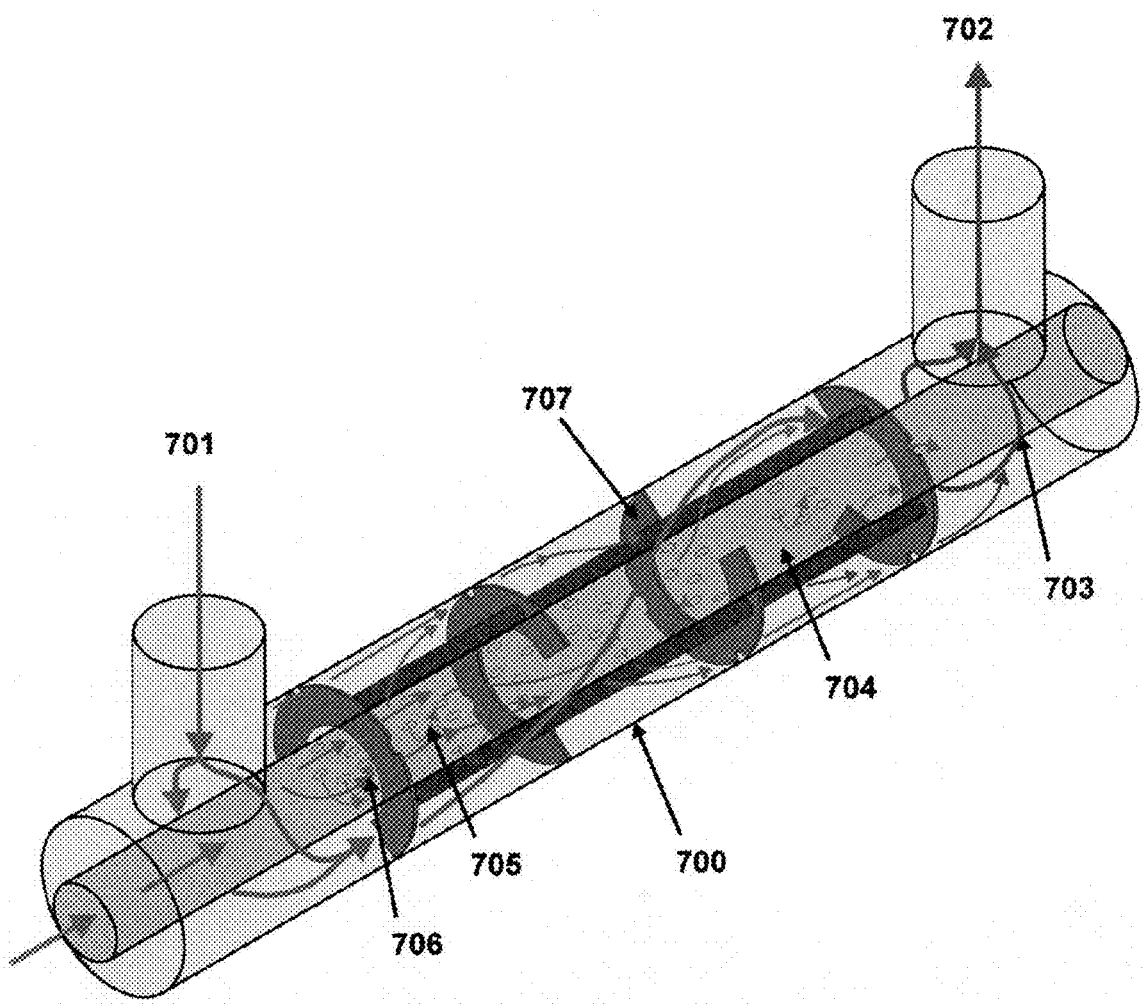
FIG. 7 – Fluid Mixing Apparatus for Industrial Processes
(Replacement)

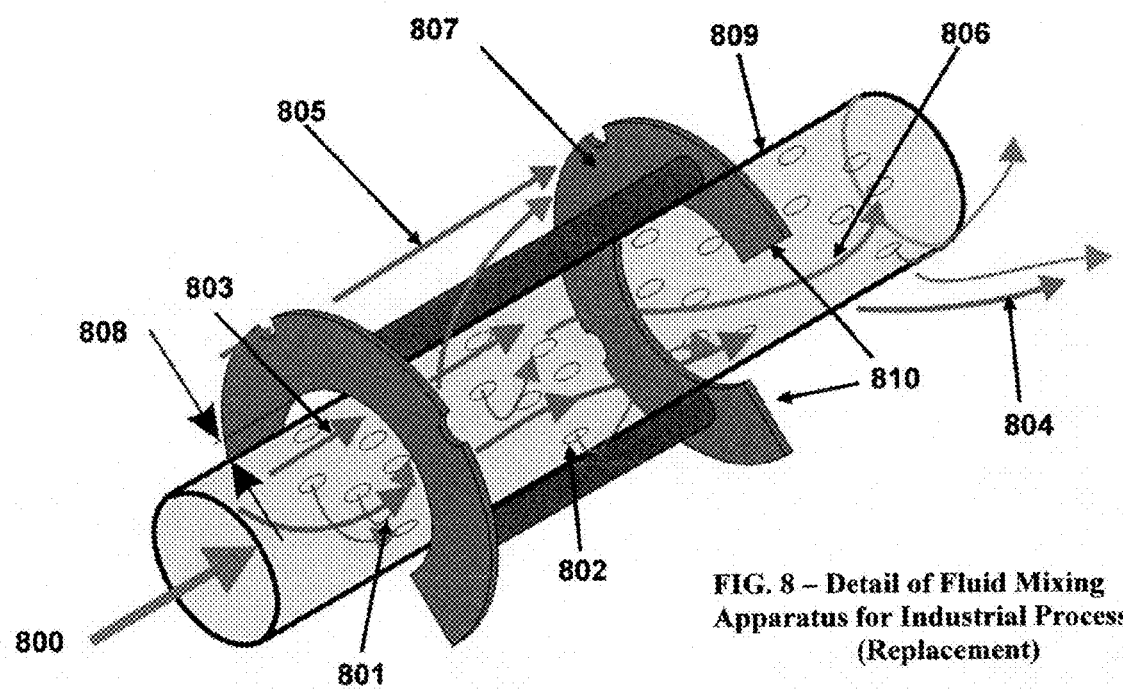
FIG. 8 – Detail of Fluid Mixing Apparatus for Industrial Processes (Replacement)

IN LINE MIXER

TECHNICAL FIELD

The present disclosure relates generally to UV disinfection systems. More specifically, but not by way of limitation, this disclosure relates to treating opaque liquids using a novel in-line mixer designed to maximize the liquid exposure time to UV radiation, while mixing the liquid to assure whole liquid volume treatment. Furthermore, the present disclosure relates to fluids mixing technologies.

BACKGROUND OF THE INVENTION

In an Ultra Violet (UV) reactor without any or adequate fluid control devices, i.e. a simple or plain chamber with UV source(s), the fluid takes the shortest path in its passage through the reactor between the inlet and outlet piping (see FIG. 1). Laminar flow based reactors require fluids with high transmission levels (low UV absorbance properties) to effect adequate dose levels on the fluid since the fluid in the region of the wall of the reactor (farthest away from the lamp or lamps) will receive the lowest dose from the UV source(s). The lower the transmission of the fluid (i.e. the higher the absorbance properties with respect to the UV wavelength), the lower the UV levels will be at the reactor wall, and with laminar (or short circuit) flow, the higher the biological reactor level breakthrough will be (i.e. higher levels of pathogens passing through the reactor untreated by the UV). From FIG. 1 it can be seen that the fluid on the opposite side of the inlet and outlet sections (A) are effectively stagnant (zero to no flow) and merely are a void of fluid when the reactor is initially filled with fluid—all (or most) of the fluid flow occurs between the inlet and outlet piping. Laminar flow based reactors have the advantage of lower head pressure requirements to drive fluid through them, but suffer from a small range of transmission level variance that they can effectively cope with or treat (i.e. suited to high UV transmittance water quality only). Laminar flow between the inlet and outlet of a reactor is therefore highly undesirable when the intent is to biologically treat fluids with a large range of transmission levels, and fluids with low or even very low UV transmission levels (UVT), approaching or down to 0% UVT.

Typical applications for low UVT fluid disinfection by UV radiation are found in the copper forming industry where an oil-water emulsion is used to cool and lubricate the copper forming process as it passes through the extrusion mold. The emulsion after forming is fed through a filter to remove any metallic debris. After the filter, the heated emulsion is fed though a heat exchanger to reduce the temperature and recycled back to the extrusion process. After the emulsion exits the heat exchanger and returns the extrusion mold its temperature is typically around 110° F. (43.3° C.), at this temperature bacteria and pathogens are able to consume the oil as nutrient. Microbial contamination of Metal Working Fluids (MWF's) causes biofouling and degradation and is also associated with several health hazards. Development of an effective control method is therefore essential to reduce microbial loading in MWF's. In order to demonstrate the harmful pathogenic potential to humans, some biological background of the species is necessary. Bacteria, Pseudomonas fluorescens, P. oleovorans subsp. *lubricantis* and Mycobacterium chelonae are found in the MWF's (*Pseudomonas* species). *Stenotrophomonas maltophilia* is an emerging multidrug-resistant global opportunistic pathogen found in the MWF's. The increasing incidence of nosocomial and community-acquired *S. maltophilia* infections is of particular concern for immunocompromised individuals, as this bacterial pathogen is associated with a significant fatality/case ratio. *S. maltophilia* is an environmental bacterium found in aqueous habitats, including plant rhizospheres, animals, foods, and water sources. Infections of *S. maltophilia* can occur in a range of organs and tissues; the organism is commonly found in respiratory tract infections. *S. maltophilia* has been reported to survive and persist in chlorinated water distribution systems. Treating the bacteria in the MWF's with chemicals (biocides) poses tremendous health issues to the factory workers, making them ill and adversely affecting production; not using biocides allows the pathogens to consume the oil in the MWF's which negatively affects the forming process and exposes the workers to a pathogen bio-hazard. The solution is to treat the pathogens with a non-chemical process such as UV radiation which protects both the oil in the MWF's and the factory personnel, however the UVT values of the MWF's can be as low as zero %; for this application a reactor with a high fluid mixing ratio, along with high levels of turbulence is required to effectively channel all the fluid within the reactor to the UV source as often, and for as long as possible. To achieve this objective the in-line mixer in this publication will be used.

Fruit juice and liquid dairy products require sterilization after production and prior to the packaging process (bottles, cartons etc); this can be achieved by an electron beam irradiating process which is a costly piece of equipment, or alternatively with a UV reactor with an in-line mixer. In the case of UV treatment of milk as opposed to traditional heat based pasteurization, the heat element is removed which therefore preserves the nutrients; the taste property is also preserved since the milk does not undergo a heating process with UV disinfection; heat alters the taste properties of milk. The higher the pasteurization level required, the higher the heat needs to be, and the more the taste is altered (long life milk is an example of high heat pasteurization). Both milk and orange juice have low to zero UVT properties and therefore require an ine-line based UV disinfection in order to achieve disinfection.

In the off-shore marine oil extraction process, sea water is often driven into the well to displace the oil; however this water requires disinfection otherwise the bio-loading of the sea water will consume the oil as nutrient; it can also cause bio-masses in the oil field which in turn then require higher water pressures to overcome them. A UV reactor with an in-line mixer will ensure maximum UV dose to the sea water with a range of UVT properties prior to the introduction into the well site.

Existing prior art apparatuses recognize the benefits of creating turbulence in the fluid under treatment with the purpose of thoroughly mixing it to assure that all the volume of the fluid under treatment will be subjected to UV radiation and to eliminate stagnant zones where the microorganisms are able to multiply while avoiding exposure to UV radiation. One invention (U.S. Pat. No. 5,626,768) proposes as method of creating turbulences to increase the fluid velocity, failing to realize that radiating all the fluid is only part of the disinfection process. Equally as important is the exposure time to UV radiation (UV dose); this exposure time needs to be long enough in order for the fluid under treatment to get the necessary dose of energy to deactivate the microorganisms' by way of damaging or destroying their DNA (dose dependant). Since the UV dose is proportional to both radiation intensity and exposure time, when increasing the fluid velocity, the exposure time decreases, with its undesirable consequences.

Other existing inventions use devices meant to create fluid turbulences, which upon careful examination do not deliver the claimed results. U.S. Pat. No. 5,675,153 includes a UV disinfection reactor which has a cylindrical shape and an internal helical deflector with radial slots. Liquid flow simulation studies on this apparatus shows that the claim is actually overstated. There is indeed some swirling effect which will result in turbulences, but it can be easily demonstrated using modern liquid flow simulation software that the ECO-UV invention is superior for opaque liquid treatment using UV radiation technology; furthermore ECO-UV's solution is far simpler and cheaper to manufacture. The same conclusion applies to U.S. Pat. No. 5,785,845 which develops an elaborate and complex internal profile of grooves and ridges to create a baffling structure that will alternate with ring-like and spiral-like paths in the contaminated liquid's path throughout an elongated reactor, or U.S. Pat. No. 6,280,615 B1 which develops an elaborate and complex internal profile of scallop shapes with peaks and troughs, with the peaks of the two surfaces being relatively offset so as to cause the liquid and the gas entering the chamber to flow along a generally sinuous path through the chamber to create a turbulent flow which promotes intimate mixing. Although the swirling effect will cause the fluid to spend additional time in the treatment zone, the turbulences created by this solution were found to have questionable efficiency.

Another invention (U.S. Pat. No. 6,344,176 B1) adopts a different approach in order to assure whole liquid volume exposure to UV radiation. It creates a thin film of the treated fluid by a partially immersing a rotating drum structure that will transport the fluid through an area with powerful UV radiation. The shortcomings associated with this invention are that it will need a large surface structure to efficiently treat adequate fluid flow, since it is only able to move a thin layer into the treatment zone. Turbulent flow is the only effective method for processing large volumes effectively; turbulence alone does not necessarily equate to desired pathogenic disinfection results; the method-specific control of turbulence with internal tangential flow patterns within the radiation zone is the required mechanism in order to optimize the disinfection performance of a reactor

BRIEF DESCRIPTION OF THE DRAWINGS

FIG. 1 represents a typical UV Reactor used for biological sterilization of a liquid using UV radiation.

FIG. 2 illustrates the in-line mixer detail that constitutes the object of the present invention, including the plates designed to create the liquid flow turbulences and their support rods.

FIG. 3 is a three-dimensional illustration of the in-line mixer design that constitutes the object of the present invention emphasizing the turbulence enhancing plates' orientation, and the in-line mixer end plates mounting details.

FIG. 4 represents the specific design of the turbulence enhancing plate which is part of the in-line mixer apparatus.

FIG. 5 represents the specific design of the end plate which is also part of the in-line mixer apparatus.

FIG. 6 is a two-dimensional illustration of the in-line mixer design that constitutes the object of the present invention emphasizing the turbulence enhancing plates' orientation and the in-line mixer turbulence zones.

FIG. 7 represents the complete fluid mixing apparatus for various industrial processes which is another object of this invention. Fluid flow patterns are graphically represented to highlight further benefits claimed by this invention.

FIG. 8 is a detailed representation of the fluid mixing apparatus presented in FIG. 7. It shows the multiple fluid paths with various mixing effects that constitutes the object of the present invention.

DETAILED DESCRIPTION OF THE INVENTION

Certain aspects and features of the present disclosure relate to a UV sterilization apparatus including a UV reactor incorporating the novel in-line mixer to enhance the disinfection process and make it efficient when treating turbid and opaque fluids (Low UVT % and high UV absorbance). The in-line mixer (FIG. 3) is comprised of a series of plates held together by means of a support system (typically, but not limited to, multiple rods). In this disclosure each individual plate 307 has a "horseshoe" type appearance, the top or round section 400 practically and purposely closes off the pipe-like section of the reactor where it is positioned in the fluid flow. The lower section 403 of the plate is open to allow the fluid to pass freely. The individual plate has small openings 402 on the circumference where the plate arc and reactor inner wall mate to allow small amounts of fluid to pass. It also has an inner plate arc 401 to allow the UV source to pass in the proximity of typically the quartz sleeve which houses the UV lamp. The inner plate arc 401 is larger than that of the quartz sleeve allowing a small volume of fluid to pass between the quartz sleeve and the in-line mixer plate at the said location 401.

In some examples in FIG. 4, each plate has 3 securing holes 402, however there are 4 supporting rods in the assembly; each in-line mixer plate is attached by three of the four rods allowing the forth rod to pass through the opening of the plate (403 in FIG. 4) in each case. Following the first plate in the assembly (FIG. 6, Zone 1), each sequential in-line mixer plate is rotated 90 degrees in succession (FIG. 6, Zones 2 through 9 in this configuration). The plate openings along the assembly follow the 2D Cartesian coordinate plane of 270 degrees for zone 1, 0 degrees for zone 2, 90 degrees for zone 3, 180 degrees for zone 4 and repeating thereafter for as many partial rotations that are required for the particular application. For the in-line mixer design, a minimum of one plate is required. One plate will interrupt the short-circuiting laminar fluid flow effect between the inlet and outlet reactor or general piping as long as the in-line mixer plate opening (403 in FIG. 4) is located on the opposite end of the said reactor piping. Any number of plates can be used for a particular application; in this example two complete fluid rotations are achieved with eight plates. As described in this configuration each subsequent plate is rotated 90 degrees from its preceding plate, however the angle is not limited to 90 degrees; various configurations may require different offset angles to achieve particular and desired mixing result pattern. In FIG. 6, fluid is introduced into zone 1 and exits at zone 9. For the minimum configuration using one plate, fluid would be introduced into zone 1 and exit at zone 2; there would be no zones beyond zone 2 in the minimum configuration. A typical in-line mixer design has, but is not limited to, two end plates as detailed in FIG. 5 to complete the assembly, and is the start and end of the support rod mechanism. The end plates typically have a locking screw type mechanism 502 to lock the assembly to the reactor walls or pipe (application dependant); the locking screws serve to secure the in-line mixer inside the reactor vessel in which it is installed such that the passing fluid around the in-line mixer assembly does not cause it to rotate.

In some examples (FIG. 2) the fundamental fluid flow (203) is forced through the main in-line mixer openings. Since each of the plates are rotated 90 degrees (from FIG. 6), the fundamental fluid flow rotates as it passes from the inlet to the outlet sections. Since there is a small gap between the inner arc of the in-line mixer plate(s) and the outer diameter of the quartz sleeve, a relatively small volume of fluid 204 passes between the plate and the quartz sleeve at a high velocity with respect to the fundamental fluid flow 203. Fluid flow 204 is a mechanically forced tangential thin film and passes directly over the quartz sleeve and is exposed to the maximum radiant flux of the UV source, after passing the in-line mixer plate. Fluid 204 joins the fundamental fluid path 203 until the next plate in the in-line mixer assembly is encountered by the flow, where after the process repeats itself. Relatively small amounts of fluid 206 located at the reactor extremities (location farthest from the UV source), flow through the openings located at the upper arc of the turbulence enhancing plate (402 in FIG. 4) and join the fundamental fluid flow 203. The fluid flow through these openings rotate with the fundamental flow though the alternating openings of the in-line mixer plates to alleviate reactor wall extremity fluid dead zones (areas with stagnant or no fluid flow). The effects of fluid flows 203, 204 and 206 create effective mixing of all the fluid within the reactor or vessel, break up otherwise stagnant fluid regions and eliminate inlet to outlet fluid short circuiting. UV dose of the fluid inside a reactor is defined as the product of UV intensity (radiant flux) and residence time spent therein; from this definition the biological effectiveness of a UV reactor would therefore be dependant on the aggregate or average delivered dose throughout the fluid, i.e. fluid passing directly over the UV source would receive the maximum radiant flux, while the fluid passing at the reactor walls would receive the minimum radiant flux. In a reactor without an in-line mixer, fluids with high transmission properties would receive adequate UV intensity levels at the reactor walls making the aggregate dose throughout the reactor biologically effective, while fluids with low UV transmission (UVT) properties would have low or inadequate radiant flux at the reactor wall location allowing a volume of untreated fluid to bypass the reactor; the aggregate of the untreated fluid combined with the treated fluid that did receive an adequate dose (close to the UV source) could render the reactor biologically ineffective depending on how low the UVT properties were (regardless of the flow rate). In a UV reactor with an in-line mixer which is the object of this invention, all of the fluid is forced into close proximity of the UV source, albeit for short periods of time, but repetitive; the radiant flux and residence time distribution in the reactor would effect a substantially higher aggregate UV dose on the fluid than a reactor style without an in-line mixer; the elevated aggregate dose effect increases as the UVT properties of the fluid decreases with the use of this in line mixer.

Other applications and adaptations (refer to FIGS. 7 and 8) include but are not limited to:

a) Chemical mixing (E.g. sodium hypochlorite with water). In this case, the "quartz sleeve" would be replaced by a pipe 809 with orifice(s) or this description herein referred to as the center pipe. A fluid or chemical 800 (possibly concentrated), pressurized in the center pipe would discharge through orifice(s) 802 into the fundamental flow of fluid between the inlet and outlet piping (previously described). The in-line mixer would then thoroughly mix the induced or injected chemical or substance from the center pipe into the fundamental fluid flow stream: The fluid 801 coming out of orifice(s) 802 will mix with the fundamental fluid stream due to the siphoning effect created by the high velocity liquid 803 passing through the narrow gap 808 between the pipe 809 surface and the inner plate arc 401.

b) Gas to liquid mixing (E.g. chlorine or ozone gas with water). In this example the "quartz sleeve" would be replaced by a pipe with orifice(s) for this description herein referred to as the center pipe. A pressurized gas 800 in the center pipe would discharge through orifice(s) 802 into the fundamental flow of fluid between the inlet and outlet piping (previously described). The in-line mixer would then thoroughly mix the induced or injected gas from the center pipe into the fundamental fluid flow stream due to the siphoning effect created by the high velocity liquid 803 passing through the narrow gap 808 between the pipe 809 surface and the inner plate arc 401.

These illustrative examples are given to introduce the reader to the general subject matter discussed herein and are not intended to limit the scope of the disclosed concepts. It will be apparent to those skilled in the art that modifications, additions, and deletions, especially in shape, size, and arrangement of parts, can be made therein without departing from the spirit and scope of the invention and the teachings herein, as set forth in the following claims.

What is claimed is:

1. A fluid treatment apparatus to enhance a disinfection process and make it efficient when treating turbid and opaque fluids, comprising:
  a. an inner germicidal ultraviolet lamp as a source of UV-C radiation;
  b. an elongated quartz sleeve, extending around the ultraviolet lamp to protect the lamp from coming into contact with the fluid under treatment;
  c. an outer tubular duct (UV reactor) containing an inlet and an outlet port at or close to its opposite ends to allow for easy flow of the fluid under treatment constructing the UV reactor chamber; and,
  d. a series of horseshoe-shape plates placed inside the UV reactor chamber and mounted around the inner ultraviolet lamp's outer quartz sleeve, held together by means of a support system consisting of multiple rods, the plates having different orientations to practically and purposely selectively close off the pipe-like section of the reactor to disrupt the laminar fluid flow, creating fluid turbulences and forcing the fluid to follow a helical path swirling around the elongated quartz sleeve, flowing through the main horseshoe-shape plate openings;
  e. the rods are structured to hold all the horseshoe-shape plates in place, forcing the water to undergo a hydraulic profile and,
  f. the plate and rod assembly is configured to be inserted during fabrication and to allow for practical and easy removal for cleaning under maintenance.

2. The fluid treatment apparatus described in claim 1 further comprising a secondary flow passage generated by additional small openings in the horseshoe-shape plates to improve the turbulence of the overall fluid flow, increasing the fluid time travelling within the UV reactor and eliminating otherwise stagnant fluid pockets.

3. The fluid treatment apparatus described in claim 1 further comprising a secondary flow passage through a narrow gap between the horseshoe-shape plates and the elongated quartz sleeve separating the ultraviolet lamp from the UV reactor inner chamber, tangentially forcing a thin film of fluid to pass directly over the quartz sleeve and exposing it to the maximum radiant flux of the UV source.

4. The fluid treatment apparatus described in claim 1 further comprising a secondary flow passage generated by additional small openings in the horseshoe-shape plates and a tertiary flow passage through a narrow gap between the horseshoe-shape plates and the elongated quartz sleeve separating the ultraviolet lamp from the UV reactor inner chamber.

5. A fluid mixing apparatus to optimize an industrial fluid mixing process, which comprises:
   a. an inner pipe having a collection of one or more orifices with the purpose to disperse a said pressurized primary fluid in a controlled way into the fluid mixing chamber;
   b. an outer tubular duct containing an inlet and an outlet port at or close to its opposite ends to allow for easy flow of a secondary fluid, constructing the fluid mixing chamber; and,
   c. a series of horseshoe-shape plates placed inside the fluid mixing chamber and mounted around the inner pipe, held together by a support system comprising multiple rods, the plates having different orientations to practically and purposely selectively close off the pipe-like section of the fluid mixer to disrupt the otherwise laminar fluid flow, creating fluid turbulences and forcing the fluid to follow a helical path swirling around the elongated fluid mixing chamber, following the main horseshoe-shape plate openings;
   d. the rods are structured to hold all the horseshoe-shape plates in place, forcing the water to undergo a hydraulic profile and,
   e. the plate and rod assembly is configured to be inserted during fabrication and to allow for practical and easy removal for cleaning under maintenance.

6. The fluid mixing apparatus described in claim 5 further comprising a secondary flow passage generated by additional small openings in the horseshoe-shape plates to improve the turbulence of the overall fluid flow for enhanced fluid mixing.

7. The fluid treatment apparatus described in claim 5 further comprising a secondary flow passage through a narrow gap between the horseshoe-shape plates and the inner pipe having a collection of orifices, forcing a thin film of fluid to pass tangentially over the inner pipe to enhance the fluids mixing process.

8. The fluid treatment apparatus described in claim 5 further comprising a secondary flow passage generated by additional small openings in the horseshoe-shape plates and a tertiary flow passage through a narrow gap between the horseshoe-shape plates and the inner pipe having a collection of orifices to further improve the fluids mixing process.

* * * * *